United States Patent Office 3,441,624
Patented Apr. 29, 1969

3,441,624
HYDROGENATION ISOMERIZATION OF AROMATICS AND CYCLOPARAFFINS
John W. Myers, Bartlesville, Okla., assignor to Phillips Petroleum Company, a corporation of Delaware
Filed May 8, 1967, Ser. No. 636,634
Int. Cl. C07c 5/10
U.S. Cl. 260—666                    6 Claims

ABSTRACT OF THE DISCLOSURE

Aromatic hydrogenation and cycloparaffin isomerization are effected simultaneously in contact with a Group VIII noble metal catalyst on halogen treated alumina at a temperature in the range of 150 to 275° F., a pressure in the range of 50 to 1500 p.s.i.g., a liquid hourly space velocity in the range of 0.1 to 10, and with hydrogen feed rate in the range of 0.5 to 10 mols per mol of hydrocarbon feed.

---

This invention relates to a process for the simultaneous hydrogenation of aromatics and isomerization of cycloparaffins.

The use of a Group VIII metal-halogen treated alumina catalyst for a combined hydrogenation-isomerization process as applied to benzene and normal hexane is disclosed in U.S. Patent 3,250,918. This is followed by a low-temperature methylcyclopentane isomerization step. Isomerization of methylcyclopentane to cyclohexane with the same type of catalyst is disclosed in U.S. Patent 3,264,361. However, the temperature utilized (650–750° F.) is so high that cyclohexane production is not favored thermodynamically.

It has now been found that both aromatic hydrogenation and cycloparaffin isomerization can be effected efficiently in the same reactor in a single step by operating under specific conditions outlined hereinbelow.

Accordingly, it is an object of the invention to provide an improved process for simultaneously hydrogenating aromatic hydrocarbons and isomerizing cycloparaffin hydrocarbons. Another object is to provide a low-temperature process for simultaneously hydrogenating aromatics and isomerizing cycloparaffins. Another object is to provide a process for simultaneously converting toluene to methylcyclohexane and dimethylcyclopentanes to methylcyclohexane. An additional object is to provide a process for simultaneously converting benzene and methylcyclopentane to cyclohexane. Other objects of the invention will become apparent to one skilled in the art upon consideration of the accompanying disclosure.

A broad aspect of the invention comprises simultaneously hydrogenating an aromatic hydrocarbon and isomerizing a cycloparaffin hydrocarbon in a mixed stream of these hydrocarbons by contacting said mixed stream with a catalyst consisting essentially of a Group VIII noble metal-halogen treated alumina catalyst at a temperature in the range of 150 to 275° F., a pressure in the range of 50 to 1500 p.s.i.g., a liquid hourly space velocity in the range of 0.1 to 10, and in admixture with 0.5 to 10 mols of hydrogen per mol of feed, and recovering resulting hydrogenated and isomerized products. The preferred catalyst comprises essentially a composite of alumina and platinum with the platinum in a concentration in the range of about 0.01 to 5, preferably 0.1 to 1.0 percent by weight of the composite and combined chlorine or bromine. The amount of combined halogen is generally in the range of about 0.5 to 10, preferably, 1 to 6 weight percent of the composite. Activated alumina, preferably eta-alumina, is utilized in the composite. Other noble metals of the platinum group, such as ruthenium, rhodium, palladium, osmium, and iridium may be utilized in lieu of platinum or in addition thereto. The halogen activation is effected after addition of the Group VIII metal to the support, because of the sensitivity of the treated catalyst to water. Any convenient source of halogen may be used, such as the halogens themselves, the hydrogen halides, the halo-hydrocarbons, the inorganic metal or nonmetal halides, and the like.

The combined aromatic hydrogenation-cycloparaffin isomerization process of the invention is applicable to any hydrocarbon stream containing both aromatic and cycloparaffin hydrocarbons. Inasmuch as such a stream is usually obtained by fractional or azeotropic distillation, it will usually contain aromatic and cycloparaffin hydrocarbons having the same number of carbon atoms, such as benzene, methylcyclopentane, and cyclohexane, or toluene, dimethylcyclopentanes, and methylcyclohexane. With the first-mentioned stream, the principal product of the combined hydrogenation-isomerization process is cyclohexane, and with the second-mentioned stream, methylcyclohexane. A particularly suitable feed from which concentrates to which the process of the invention is applicable can be separated is the effluent from the hydrocracking of a heavy material such as a cycle oil to maximize the production of gasoline-range hydrocarbons. It is within the scope of the invention to apply the combined hydrogenation-isomerization process to a stream having relatively low concentrations of, for example, benzene and methylcyclopentane, but it is more desirable to apply the process to concentrates that have been separated by fractional or azeotropic distillation. A preferred feed stream is a mixture of $C_6$ and $C_7$ aromatics and isoparaffins.

It is also within the scope of the invention to choose temperatures and pressures within the broad ranges indicated such that the combined process is carried out in vapor phase, in liquid phase, or as a combined liquid phase-vapor phase operation. In the latter operation, advantage can be taken of the endothermic heat of vaporization of the liquids present to absorb the exothermic heat of hydrogenation of the aromatic.

The following specific examples are presented to illustrate the invention and are not to be construed as unnecessarily limiting the same.

EXAMPLE I

A chloride-treated platinum-eta-alumina catalyst was prepared by impregnating $\frac{3}{16}$-inch pellets of eta-alumina with aqueous chloroplatinic acid, drying at about 215° F., calcining in a stream of hydrogen for 1 hour at 700° F. and 1 hour at 1200° F., and calcining in a stream of hydrogen chloride for 1.5 hours at 1200° F. The catalyst was then cooled to room temperature with HCl passing over it. The finished catalyst contained about 0.7 weight percent platinum and about 2.5 percent chlorine. This catalyst was used in the hydrogenation-isomerization of a $C_7$ hydrocarbon stream at 208° F., 100 p.s.i.g., 2.1 LHSV (liquid hourly space velocity), and with 4 mols of hydrogen per mol of hydrocarbon. The $C_7$ feed stream contained 0.048 weight percent carbon tetrachloride to maintain the halogen content of the catalyst. Feed and product analyses are presented in Table I.

TABLE I

| Component, wt., percent | Feed | Product |
|---|---|---|
| $C_5$ | 0.0 | 0.8 |
| Cyclohexane | 1.2 | 0.9 |
| Multiple-branched $C_7$ paraffins | 18.5 | 26.8 |
| Methylhexanes | 47.4 | 42.2 |
| n-Heptane | 20.6 | 17.5 |
| Methylcyclohexane | 0.7 | 8.0 |
| Dimethylcyclopentanes | 6.5 | 2.3 |
| Toluene | 3.3 | 0.1 |
| $C_8+$ | 1.8 | 1.4 |
| Total | 100.0 | 100.0 |

These data show that the toluene is almost completely converted to methylcyclohexane, and that the dimethylcyclopentanes are extensively converted to methylcyclohexane.

EXAMPLE II

A chloride-treated platinum-eta-alumina catalyst was made in exactly the same manner as the catalyst of Example I except that 1/8-inch alumina pellets were used. This catalyst was used in the hydrogenation-isomerization of a $C_6$ hydrocarbon stream at 160° F., 500 p.s.i.g., 1.1 LHSV, and with 3.6 mols of hydrogen per mol of hydrocarbon. The $C_6$ feed stream 0.048 weight percent carbon tetrachloride to maintain the halogen content of the catalyst. Feed and product analyses are presented in Table II.

TABLE II

| Component, wt., percent | Feed | Product |
|---|---|---|
| n-Pentane | Trace | 0.1 |
| Dimethylbutanes | 0.3 | 3.2 |
| Methylhexanes | 18.8 | 22.3 |
| Methylcyclopentane | 23.8 | 13.7 |
| n-Hexane | 49.3 | 40.6 |
| Cyclohexane | 3.1 | 19.5 |
| Benzene | 4.3 | <0.1 |
| $C_7$'s | 0.4 | 0.6 |

These data show that the benzene is almost completely converted to cyclohexane, and that the methylcyclopentane is extensively converted to cyclohexane.

EXAMPLE III

Advantage is taken of the fact that methylcyclopentane and benzene form an azeotrope boiling at 161° F. and containing 86 mol percent methylcyclopentane and 14 mol percent benzene to separate a concentrate from the $C_6$ stream resulting from hydrocracking of a cycle oil. This concentrate containing 88 mol percent methylcyclopentane and 12 mol percent benzene, is treated with a catalyst similar to that of Example II under conditions similar to those of that example except that the temperature is 200° F. and the liquid hourly space velocity is 0.5. Essentially complete conversion of the benzene to cyclohexane is obtained and essentially equilibrium conversion of the methylcyclopentane to cyclohexane is obtained by fractionation of the reactor effluent to recover methylcyclopentane as an overhead stream and cyclohexane as a bottoms stream. About 67 mols of MCP is recycled so that the feed comprises 155 mols of MCP, 12 mols of benzene, and 670 mols of hydrogen.

Certain modifications of the invention will become apparent to those skilled in the art and the illustrative details disclosed are not to be construed as imposing unnecessary limitations on the invention.

I claim:
1. A process for simultaneously hydrogenating an aromatic hydrocarbon and isomerizing a cycloparaffin hydrocarbon in a mixed stream thereof which comprises contacting said mixed stream with a catalyst consisting essentially of a Group VIII noble metal-halogen treated alumina catalyst at a temperature in the range of 150 to 275° F., a pressure in the range of 50 to 1500 p.s.i.g., a liquid hour space velocity in the range of 0.1 to 10, and in admixture with 0.5 to 10 mols of hydrogen per mol of feed, and recovering resulting hydrogenated and isomerized products.

2. The process of claim 1 wherein said Group VIII metal comprises essentially platinum.

3. The process of claim 1 wherein said mixed stream comprises essentially $C_6$ and $C_7$ aromatics and cycloparaffins.

4. The process of claim 1 wherein said aromatic comprises essentialy benzene and said cycloparaffin comprises essentialy methylcyclopentane.

5. The process of claim 4 wherein the feed is an azeotrope boiling at 161° F. containing 86 mol percent methylcyclopentane and 14 mol percent benzene and substantially complete conversion of said feed to cyclohexane is effected by recycling unconverted methylcyclopentane.

6. The process of claim 1 wherein said aromatic comprises essentially toluene and said cycloparaffin comprises essentially dimethylcyclopentanes.

References Cited

UNITED STATES PATENTS

| 3,161,586 | 12/1964 | Watkins | 208—143 |
| 3,233,001 | 2/1966 | Merryfield et al. | 260—666 |
| 3,250,816 | 5/1966 | Waldby | 260—666 |
| 3,250,819 | 5/1966 | Cabbage | 260—666 |
| 2,718,535 | 9/1955 | McKinley | 260—666 |
| 3,264,361 | 8/1966 | Schellenburg | 260—666 |
| 3,239,573 | 3/1966 | Cabbage | 260—666 |

DELBERT E. GANTZ, *Primary Examiner.*

V. O'KEEFE, *Assistant Examiner.*

U.S. Cl. X.R.

260—667